United States Patent
Morishima et al.

(10) Patent No.: US 11,677,244 B2
(45) Date of Patent: Jun. 13, 2023

(54) CONTROLLING THE CHARGE/DISCHARGE OPERATIONS OF MULTIPLE ELECTRIC VEHICLES IN A DISTRIBUTION NETWORK

(71) Applicant: TOYOTA JIDOSHA KABUSHIKI KAISHA, Toyota (JP)

(72) Inventors: Akinori Morishima, Naka-gun (JP); Takashi Kawasaki, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 124 days.

(21) Appl. No.: 17/169,690

(22) Filed: Feb. 8, 2021

(65) Prior Publication Data
US 2021/0313805 A1    Oct. 7, 2021

(30) Foreign Application Priority Data
Apr. 6, 2020 (JP) .............................. JP2020-068027

(51) Int. Cl.
*H02J 3/18*    (2006.01)
*G07C 5/08*    (2006.01)
(Continued)

(52) U.S. Cl.
CPC ............... *H02J 3/18* (2013.01); *B60L 53/68* (2019.02); *G05B 15/02* (2013.01); *G07C 5/085* (2013.01);
(Continued)

(58) Field of Classification Search
None
See application file for complete search history.

(56) References Cited

U.S. PATENT DOCUMENTS 9,595,844 B2 * 3/2017 Kudo ............... H02J 13/00034
9,941,727 B2 * 4/2018 Kudo ..................... H02J 3/466
(Continued)

FOREIGN PATENT DOCUMENTS

JP    2002-300726 A    10/2002
JP    2010-081722 A    4/2010
(Continued)

OTHER PUBLICATIONS

Dharmakeerthi et al., "Impact of electric vehicle fast charging on power system voltage stability", Feb. 2013, Electrical Power and Energy Systems 57 (2014) 241-249. (Year: 2013).*
(Continued)

*Primary Examiner* — Mohammad Ali
*Assistant Examiner* — Kelvin Booker
(74) *Attorney, Agent, or Firm* — Oliff PLC (57) ABSTRACT

A power control system controlling a demand-supply balance of electric power in a distribution network by controlling charge/discharge operations of storage batteries of a plurality of vehicles connected to the distribution network, includes a control unit, which creates a charge/discharge operation plan of the storage batteries within a predetermined period using a power supply and demand plan of the distribution network within the predetermined period and vehicle information indicating states of the vehicles within the predetermined period, extracts time and a point at which a voltage of the distribution network is not within a predetermined range using the charge/discharge operation plan of the storage batteries, creates a reactive power control plan for injecting reactive power at the extracted time and point to keep the voltage of the distribution network within the predetermined range, and controls the reactive power according to the created reactive power control plan.

6 Claims, 5 Drawing Sheets

(51) Int. Cl.
  *B60L 53/68* (2019.01)
  *G05B 15/02* (2006.01)
  *H02J 7/00* (2006.01)
  *H02J 13/00* (2006.01)

(52) U.S. Cl.
  CPC ...... *H02J 7/0013* (2013.01); *H02J 13/00002* (2020.01)

(56) References Cited

U.S. PATENT DOCUMENTS

| | | | |
|---|---|---|---|
| 2004/0158360 A1* | 8/2004 | Garland, II | H02J 3/38 700/286 |
| 2010/0076825 A1 | 3/2010 | Sato et al. | |
| 2010/0231040 A1* | 9/2010 | Schweitzer, III | H02P 9/48 700/297 |
| 2012/0074901 A1* | 3/2012 | Mohammed | B60L 53/11 320/109 |
| 2012/0161702 A1* | 6/2012 | Kim | B60L 53/14 320/155 |
| 2013/0119947 A1* | 5/2013 | Ishida | B60L 53/68 320/162 |
| 2014/0018969 A1* | 1/2014 | Forbes, Jr. | G05B 15/02 700/295 |
| 2014/0039703 A1* | 2/2014 | Forbes, Jr. | G05B 19/042 700/286 |
| 2014/0114850 A1* | 4/2014 | Forbes, Jr. | G06Q 20/145 705/40 |
| 2015/0002100 A1* | 1/2015 | Kudo | H02J 7/0048 320/128 |
| 2016/0368387 A1* | 12/2016 | Pavlovsky | B60L 53/122 |
| 2017/0141587 A1* | 5/2017 | Kudo | H02J 13/00016 |
| 2017/0300019 A1* | 10/2017 | Blackhall | G05B 13/0265 |
| 2018/0083447 A1* | 3/2018 | Lee | H02J 3/1814 |
| 2020/0059099 A1* | 2/2020 | Turena | H02S 50/00 |
| 2021/0028625 A1* | 1/2021 | Inoue | H02J 3/32 |

FOREIGN PATENT DOCUMENTS

| | | |
|---|---|---|
| JP | 2012-095465 A | 5/2012 |
| JP | 2016-032339 A | 3/2016 |
| JP | 2017-005912 A | 1/2017 |
| JP | 2017-093106 A | 5/2017 |

OTHER PUBLICATIONS

Singh et al., "Energy management and voltage stabilization in an islanded microgrid through an electric vehicle charging station", Dec. 2017, Sustainable Citites and Society, 41 (2018) 679-694. (Year: 2017).*

Singh et al., "Energy management and voltage stabilization in an islanded microgrid through an electric vehicle charging station", Dec. 2017, Sustainable Cities and Society 41 (2018) 679-694. (Year: 2017).*

Mehrjerdi et al., "Modeling and optimal scheduling of battery energy storage systems in electric power distribution networks", Sep. 2018, Journal of Cleaner Production 234 (2019). (Year: 2018).*

Golshannavaz, S., "Cooperation of electric vehicle and energy storage in reactive power compensation: An optimal home energy management system considering PV presence", Nov. 2017, Sustainable Cities and Society 39 (2018) 317-325. (Year: 2017).*

* cited by examiner

CONTROLLING THE CHARGE/DISCHARGE OPERATIONS OF MULTIPLE ELECTRIC VEHICLES IN A DISTRIBUTION NETWORK

CROSS-REFERENCE TO RELATED APPLICATION(S)

The present application claims priority to and incorporates by reference the entire contents of Japanese Patent Application No. 2020-068027 filed in Japan on Apr. 6, 2020.

BACKGROUND

The present disclosure relates to a power control

Japanese Laid-open Patent Publication No. 2017-5912 describes a technique, in a system allowing reverse power flow of generated power of a distributed power source to a power system, of reducing occurrence of a voltage deviation state, in which the voltage of the power system exceeds the maximum voltage, by controlling the distributed power source according to the voltage of the power system.

The technique described in Japanese Laid-open Patent Publication No. 2017-5912 assumes, as a distributed power source, a power source having a fixed position in a power system such as a photovoltaic power generator. Therefore, when the technique described in Japanese Laid-open Patent Publication No. 2017-5912 is applied to a system that uses, as a distributed power source, a storage battery that can move in the power system, the position in the power system and the charge/discharge state of the storage battery change from moment to moment, causing the voltage deviation state to occur, and the voltage of the power system may become unstable. As a storage battery that can move in the power system, a battery mounted on a vehicle such as an electric vehicle can be exemplified.

SUMMARY

There is a need for providing a power control system capable of controlling the voltage of a distribution network such that the voltage is within a predetermined range.

According to an embodiment, a power control system that controls a demand-supply balance of electric power in a distribution network by controlling charge/discharge operations of storage batteries of a plurality of vehicles connected to the distribution network, includes a control unit, which creates a charge/discharge operation plan of the storage batteries within a predetermined period using a power supply and demand plan of the distribution network within the predetermined period and vehicle information indicating states of the vehicles within the predetermined period, extracts time and a point at which a voltage of the distribution network is not within a predetermined range using the charge/discharge operation plan of the storage batteries, creates a reactive power control plan for injecting reactive power at the extracted time and point to keep the voltage of the distribution network within the predetermined range, and controls the reactive power according to the created reactive power control plan.

DETAILED DESCRIPTION

Hereinafter, a power control system according to an embodiment of the present disclosure will be described in detail with reference to the drawings.

Configuration of Virtual Power Plant

First, with reference to FIG. 1, a configuration of a virtual power plant (VPP) to which a power control system according to an embodiment of the present disclosure is applied will be described.

Figure 1:
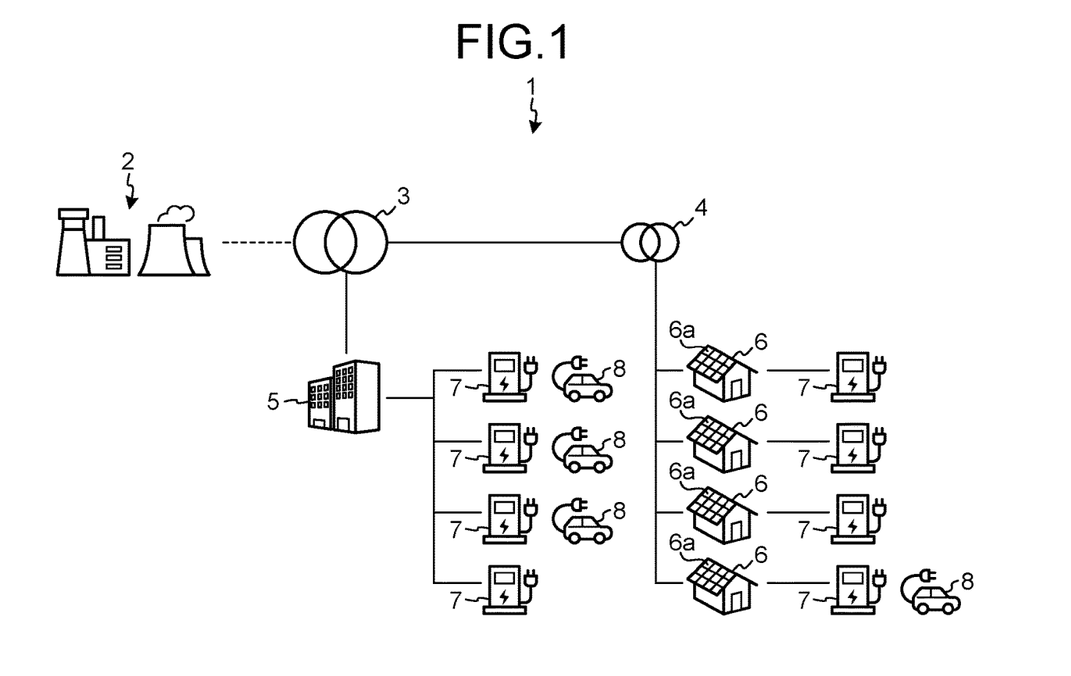
FIG. 1 is a schematic diagram illustrating a configuration of a virtual power plant to which a power control system according to an embodiment of the present disclosure is applied.

FIG. 1 is a schematic diagram illustrating a configuration of a virtual power plant to which the power control system according to an embodiment of the present disclosure is applied. As illustrated in FIG. 1, a virtual power plant 1 to which the power control system according to an embodiment of the present disclosure is applied includes a power plant 2, a distribution substation 3, a pole transformer 4, a demanding facility 5, and consumer facilities 6.

The power plant 2 includes a well-known power plant such as a hydroelectric power plant, a thermal power plant, or a nuclear power plant, and is connected to a distribution substation 3 via a power-transmission line. The power plant 2 supplies generated power to the distribution substation 3 via the power-transmission line. An ultra-high voltage substation or an intermediate substation may be arranged between the power plant 2 and the distribution substation 3.

The distribution substation 3 transforms the electric power supplied from the power plant 2 into a predetermined voltage, and then supplies the electric power to the pole transformer 4 and the demanding facility 5 via the power distribution line.

The pole transformer 4 includes distribution transformers installed on utility poles, transforms the power supplied from the distribution substation 3 to a predetermined voltage, and then supplies the electric power to the consumer facilities 6.

The demanding facility 5 includes a commercial facility or an industrial facility, and receives power supply from the distribution substation 3 via a power distribution line. In addition, the demanding facility 5 is provided with a plurality of charging stands 7, and when electric vehicles 8 are connected to the charging stands 7, the batteries of the electric vehicles 8 can be charged by using the electric power supplied from the distribution substation 3.

The consumer facilities 6 each include a house or an apartment house where a consumer lives. The consumer facility 6 can receive power supply from the pole transformer 4 via a distribution line, and can sell surplus power to a power transmission and distribution business operator or a power retailer through a power distribution line. In addition, the consumer facility 6 is provided with a photovoltaic power generation facility 6a, and the electric power generated by the photovoltaic power generation facility 6a can be used and sold. In addition, the consumer facility 6 is provided with a charging stand 7. By connecting the electric vehicles 8 to the charging stands 7, the battery of the electric vehicles 8 can be charged by using the electric power supplied from the pole transformer 4 and the electric power generated by the photovoltaic power generation facility 6a. In addition, the power of the batteries of the electric vehicles 8 can be used and sold.

As described above, the virtual power plant 1 to which the electric power control system according to an embodiment of the present disclosure is applied can adjust demand-supply balance of electric power within the distribution network by controlling the charge/discharge operations of the batteries mounted on the electric vehicles 8. According to the virtual power plant 1 described above, the generation amount of $CO_2$ can be reduced, and a fuel cost, an equipment cost, and social costs such as a carbon tax can be also reduced by effectively utilizing the electric power of the batteries mounted on the electric vehicles 8 to reduce the usage amount of fossil fuel in the power plant 2. The electric vehicles 8 each may be a hybrid vehicle (HV), a fuel cell electric vehicle (FCEV) or the like.

By the way, in the virtual power plant 1 described above, the positions and the charge/discharge states of the electric vehicles 8 in the distribution network change from moment to moment. Thus, a voltage deviation state, in which the voltage of the power system exceeds the maximum voltage, occurs, and the voltage of the distribution network may become unstable. Therefore, the power control system according to an embodiment of the present disclosure controls the voltage of the distribution network such that the voltage is within a predetermined range by performing power control processing described below. Hereinafter, the configuration and operation of the power control system according to an embodiment of the present disclosure will be described with reference to FIGS. 2 to 6.

Configuration of Power Control System

First, a configuration of a power control system according to an embodiment of the present disclosure will be described with reference to FIG. 2.

Figure 2:
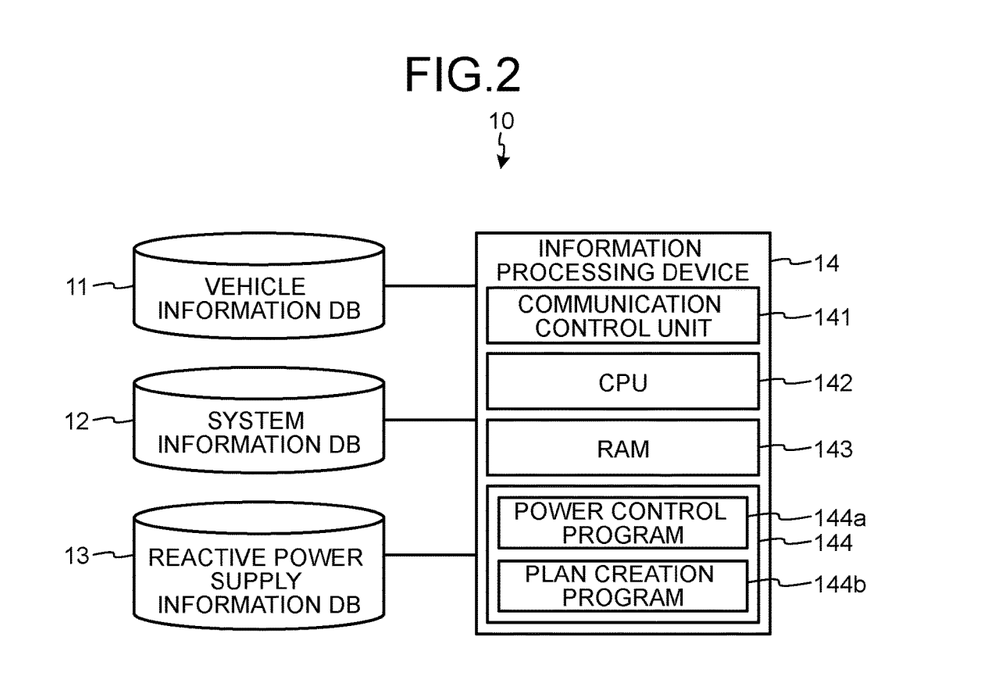
FIG. 2 is a block diagram illustrating a configuration of a power control system according to an embodiment of the present disclosure.

FIG. 2 is a block diagram illustrating a configuration of a power control system according to an embodiment of the present disclosure. As illustrated in FIG. 2, a power control system 10 according to an embodiment of the present disclosure includes a vehicle information database (vehicle information DB) 11, a system information database (system information DB) 12, a reactive power supply information database (reactive power supply information DB) 13, and an information processing device 14 as its main components.

The vehicle information DB 11 stores, as vehicle information, identification numbers of the electric vehicles 8 positioned in a controlled area of the virtual power plant 1 within a control period, the annual travelling history of each electric vehicle 8, and the battery state (capacity, state of charge (SOC) of each electric vehicle 8), the deterioration degree, etc.), action schedule information of each electric vehicle 8 (position information for each hour (commuting, at home, etc.) and whether the electric vehicle 8 is connected to the charging stand 7), the maximum charge/discharge rate of the charging stands 7 positioned in the controlled area, and information about the maximum and minimum SOC of the battery of each electric vehicle 8. The vehicle information is information provided by consumers who own the electric vehicles 8.

The system information DB 12 stores, as system information, the power supply and demand plan in the controlled area of the virtual power plant 1, and information about the configuration and various factors of the distribution network in the controlled area. Information about the configuration and various factors of the distribution network in the controlled area includes the connection form between the power plant 2, the distribution substation 3, the pole transformer 4, the demanding facility 5, the consumer facilities 6, and the charging stands 7, and various factors (output voltage, etc.) in the controlled area.

The reactive power supply information DB 13 stores, as reactive power supply information, information about facilities capable of supplying reactive power within the controlled area of the virtual power plant 1 within the control period. Specifically, the reactive power supply information includes the identification numbers of the electric vehicles 8 positioned in the controlled area of the virtual power plant 1 within the control period, the battery charge/discharge location and the maximum charge/discharge rate of each electric vehicle 8, and information about the installation locations and charge/discharge rates of the charging stands 7 positioned within the controlled area.

The information processing device 14 includes a well-known information processing device such as a workstation, and includes a communication control unit 141, a central processing unit (CPU) 142, a random access memory (RAM) 143, and a read only memory (ROM) 144.

The communication control unit 141 includes a communication circuit for information communication via a telecommunications line such as the Internet line and the power line, and controls information communication between information processing devices provided on the power transmission and distribution business operator side, the power retailer side, and the consumer side via the telecommunications line and the power line. In addition, the communication control unit 141 can also transmit control signals to various devices connected to the distribution network via the power line.

The CPU 142 loads a computer program and various types of control data stored in the ROM 144 into the RAM 143, and controls the operation of the entire information processing device 14 by executing the loaded computer program.

The RAM 143 includes a volatile storage device and functions as a working area of the CPU 142.

The ROM 144 includes a non-volatile storage device, and stores various computer programs and various types of control data. In the present embodiment, in the ROM 144, a power control program 144a and a plan creation program 144b for causing the CPU 142 to perform the power control processing described below are stored.

Power Control Processing

Next, the operation of the information processing device 14 when performing the power control processing according to an embodiment of the present disclosure will be described with reference to FIG. 3.

Figure 3:
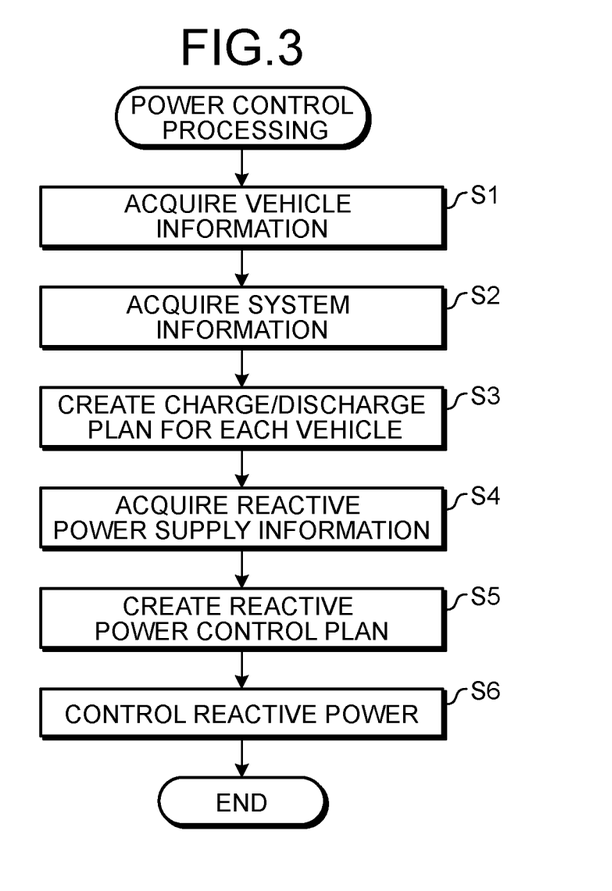
FIG. 3 is a flowchart illustrating a flow of power control processing according to an embodiment of the present disclosure.

FIG. 3 is a flowchart illustrating a flow of power control processing according to an embodiment of the present disclosure. The flowchart illustrated in FIG. 3 starts at the timing when a command to perform the power control processing is input to the information processing device 14, and the power control processing proceeds to processing of step S1. The operation of the information processing device 14 described below is realized by the CPU 142 executing the power control program 144a.

In the processing of step S1, the information processing device 14 acquires vehicle information within a creation period (for example, one week) of a charge/discharge plan of the electric vehicles 8 from the vehicle information DB 11. Specifically, the information processing device 14 acquires, as vehicle information, identification numbers of the electric vehicles 8 positioned in a controlled area of the virtual power plant 1 within a creation period of a charge/discharge plan of the electric vehicle 8, the annual travelling history of each electric vehicle 8, and the battery state of each electric vehicle 8, action schedule information of each electric vehicle 8, the maximum charge/discharge rates of the charging stands 7 positioned in the controlled area, and information about the maximum and minimum SOC of the battery of each electric vehicle 8. Thus, the processing of step S1 is completed, and the power control processing proceeds to processing of step S2.

In the processing of step S2, the information processing device 14 acquires system information within a creation period of a charge/discharge plan of the electric vehicles 8 from the system information DB 12. The system information includes a power supply and demand plan in the controlled area, the connection form between the power plant 2, the distribution substation 3, the pole transformer 4, the demanding facility 5, the consumer facilities 6, and the charging stands 7, and various factors in the controlled area. Thus, the processing of step S2 is completed, and the power control processing proceeds to processing of step S3.

Figure 4:
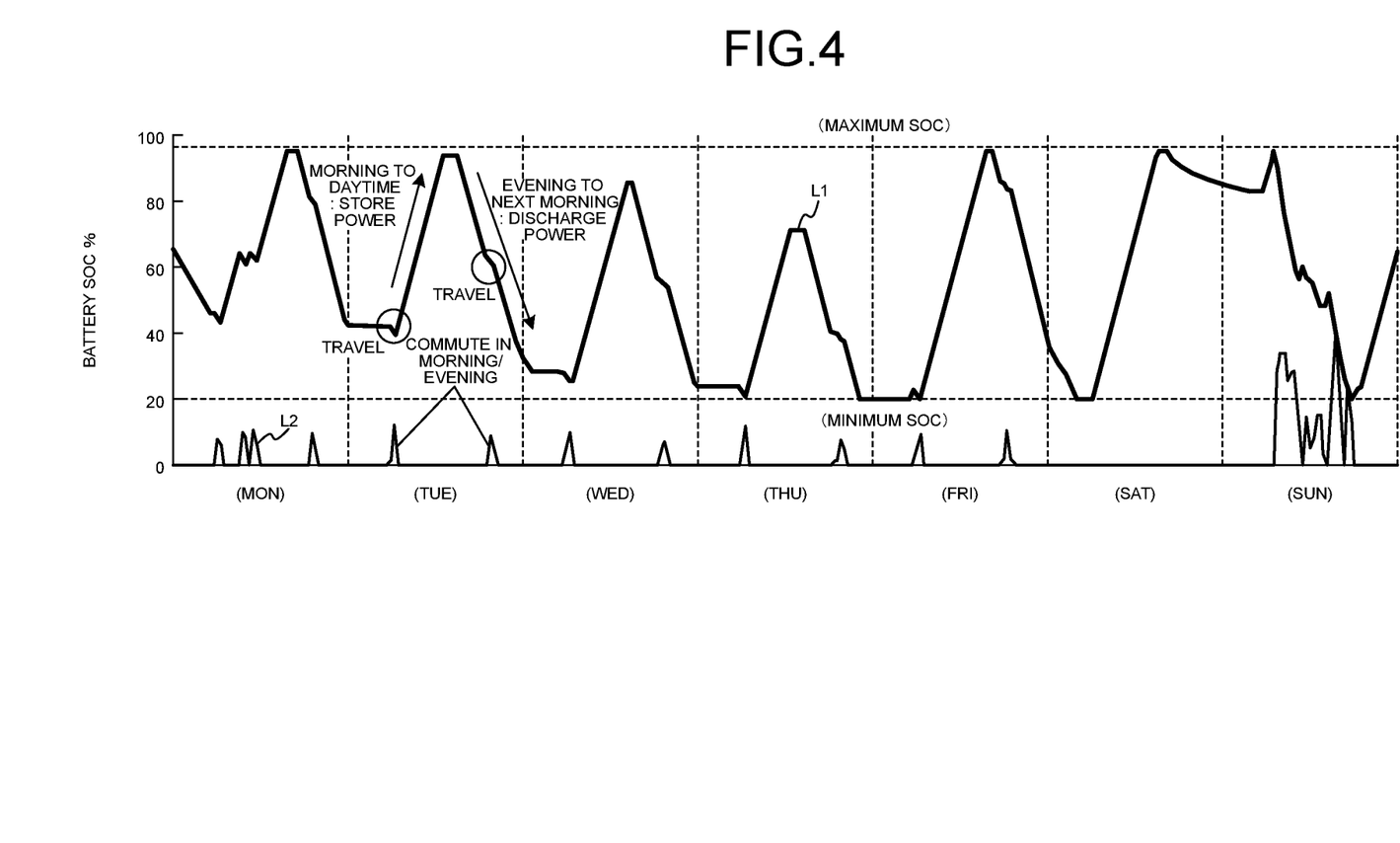
FIG. 4 is a diagram illustrating an example of a charge/discharge plan of batteries of electric vehicles.

In the processing of step S3, the information processing device 14 inputs the vehicle information acquired in the processing of step S1 and the system information acquired in the processing of step S2 into the plan creation program 144b, so that a battery charge/discharge plan for each of the electric vehicles 8 included in the vehicle information is created. Here, the plan creation program 144b is a computer program that defines a mathematical planning problem having the vehicle information and the system information as input variables and the charge/discharge plan of each electric vehicle 8 as an output variable. By executing the plan creation program 144b using various costs such as the power generation cost of the power plant 2, the deterioration degree of the battery of each electric vehicle 8, and the generation amount of $CO_2$ as evaluation functions, the optimum charge/discharge plan for the battery of each electric vehicle 8 can be created based on the costs. Since a plan creation method described above is known at the filing stage of the present disclosure, detailed description thereof will not be provided. However, for example, a plan of charging the surplus power amount to the batteries of the electric vehicles 8 during a period when the power supply amount exceeds the demand amount, and supplying the power shortage amount from the batteries of the electric vehicles 8 during a period when the power supply amount is short of the demand amount is created, so that a charge/discharge plan of the battery of the electric vehicles 8 that minimizes the power generation cost of the power plant 2 as illustrated in FIG. 4 can be created. In the battery charge/discharge plan of the electric vehicles 8 illustrated in FIG. 4, a thick line L1 indicates the temporal change of SOC within the creation period of the plan of the batteries mounted on the electric vehicles 8 is created, and a line L2 indicates the traveling behavior of the electric vehicles 8. The battery charge/discharge plan is created within the range of the maximum and minimum SOC of the batteries included in the vehicle information. Further, since the battery charge/discharge operation plan is created for each day of the week, it is possible to create a battery charge/discharge plan that reflects the behavior of the electric vehicle 8 on each day of the week. Thus, the processing of step S3 is completed, and the power control processing proceeds to processing of step S4.

In the processing of step S4, the information processing device 14 acquires the reactive power supply information from the reactive power supply information DB 13. Specifically, the information processing device 14 acquires information about the installation location and charge/discharge rate of the charging stands 7 positioned in the controlled area as reactive power supply information. Thus, the processing of step S4 is completed, and the power control processing proceeds to processing of step S5.

Figure 5A:
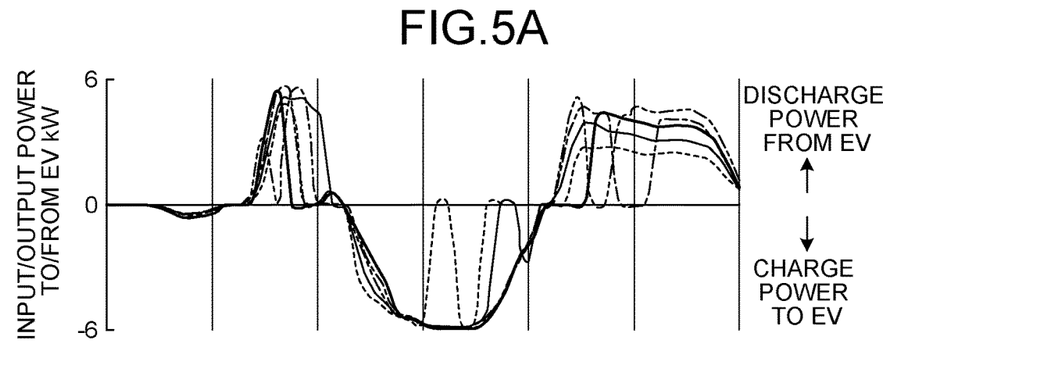
FIG. 5A is a diagram for describing processing of creating a reactive power control plan.
Figure 5B:
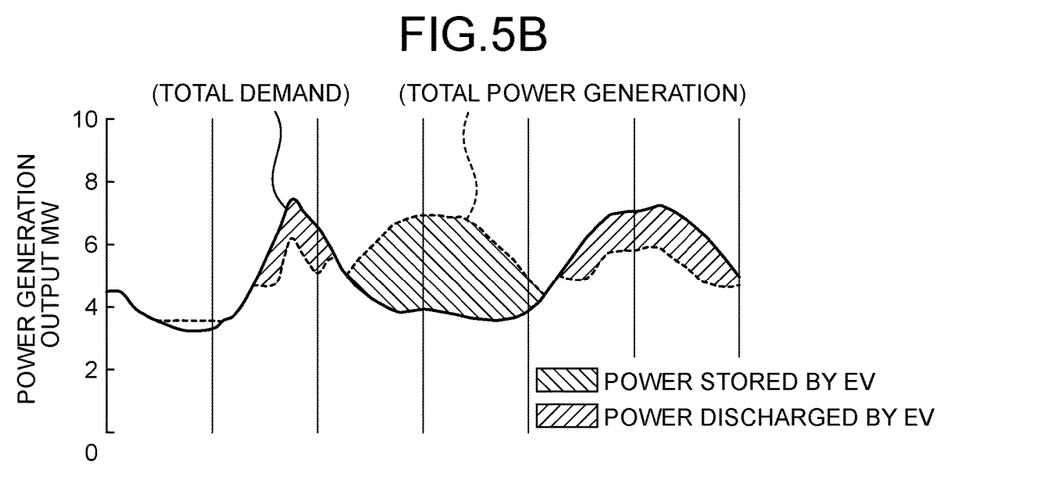
FIG. 5B is a diagram for describing processing of creating a reactive power control plan.
Figure 5C:
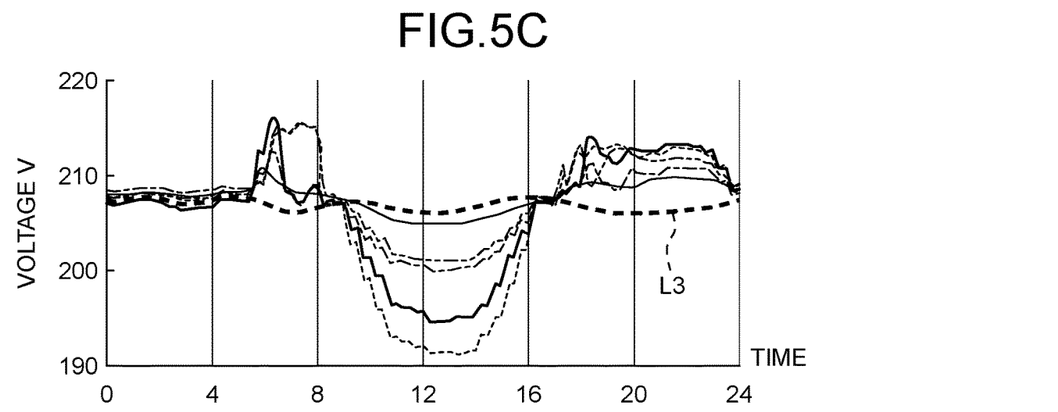
FIG. 5C is a diagram for describing processing of creating a reactive power control plan.

In the processing of step S5, the information processing device 14 creates a reactive power control plan within a creation period of a charge/discharge plan of the batteries of the electric vehicles 8. Specifically, when a battery charge/discharge plan for each electric vehicle as illustrated in FIG. 5A is created in the processing of step S3, the information processing device 14 firstly calculates the transition of the voltage at a node (point) where each electric vehicle 8 is connected to the distribution network as illustrated in FIG. 5C using the battery charge/discharge plan for each electric vehicle illustrated in FIG. 5A and the power supply and demand plan illustrated in FIG. 5B. Next, the information processing device 14 extracts periods during which the voltage of the node is not within a predetermined range centered on the reference voltage indicated by a line L3 in FIG. 5C using the transition of the voltage of each node illustrated in FIG. 5C.

Figure 6A:
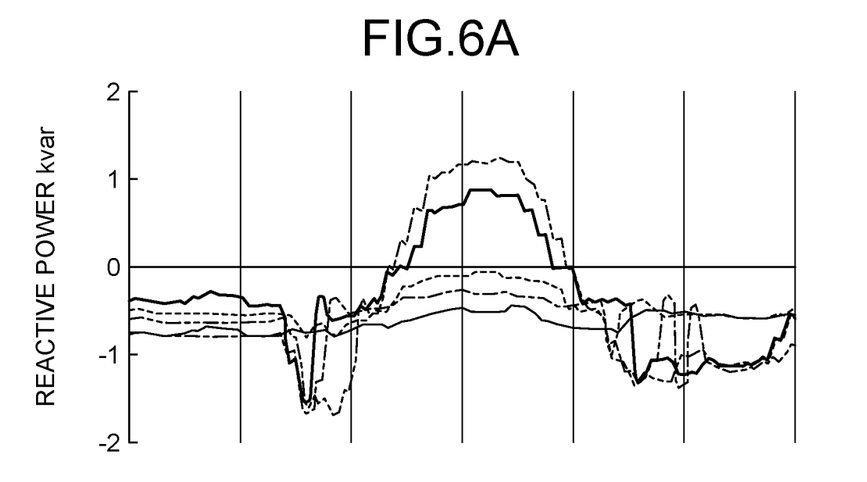
FIG. 6A is a diagram for describing processing of creating a reactive power control plan.

The information processing device 14 then creates, as a reactive power control plan, an injection plan of the reactive power from the charging stands 7 as illustrated in FIG. 6A such that in each of the extracted periods, the voltage of the node comes into the predetermined range by injection of reactive power from the charging stands 7. Specifically, there is a relationship expressed by the following expression (1) between the voltage change amount AV, the resistance R, the active power amount P, the reactance X, and the reactive power amount Q of the charging stand 7. Therefore, the information processing device 14 controls the voltage of the node such that the voltage is within the predetermined range by adjusting the voltages of the charging stands 7 by changing the reactive power amounts Q according to the expression (1) according to the difference between the voltage of the node and the reference voltage.

$$\angle V \approx R \times P + X \times Q \qquad (1)$$

Figure 6B:
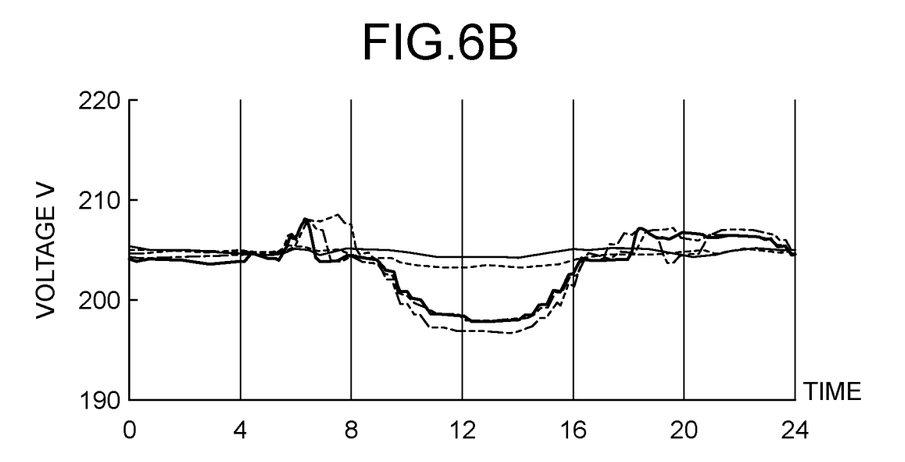
FIG. 6B is a diagram for describing processing of creating a reactive power control plan.

By applying the reactive power control plan illustrated in FIG. 6A to each node, the transition of the voltage of each node illustrated in FIG. 5C changes to the transition as illustrated in FIG. 6B, so that the voltage of each node can be kept within the predetermined range. Note that, for a node where the reactive power amount is insufficient within the output constraint of the charging stand 7, it is desirable to limit the active power amount of the charge/discharge operation or increase the reactive power amounts of other nodes. However, since it is desired that the limitation on the active power amount of the charge/discharge operation be as less as possible, it is desirable to increase the reactive power amounts of other nodes. Thus, the processing of step S5 is completed, and the power control processing proceeds to processing of step S6.

In the processing of step S6, the information processing device 14 transmits a control signal to the charging stands 7 via the communication control unit 141 to control the reactive power injection operation from the charging stands 7 according to the reactive power control plan created in the processing of step S5. Thus, the processing of step S6 is completed, and the series of power control processing is completed.

As is clear from the above description, the power control system according to an embodiment of the present disclosure extracts time and a point at which the voltage of the distribution network is not within the predetermined range using the plan of the charge/discharge operation of the batteries of the electric vehicles 8, creates a reactive power control plan for injecting the reactive power at the extracted time and point to keep the voltage of the distribution network within the predetermined range, and controls the reactive power according to the created reactive power control plan. Thus, the voltage of the distribution network can be controlled such that the voltage is within the predetermined range.

Further, since the power control system according to an embodiment of the present disclosure creates the charge/discharge operation plan of the batteries of the electric vehicles 8 and the reactive power control plan for each day of the week, the plans that reflect the behavior of the electric vehicles 8 on each day of the week can be created, so that the voltage of the distribution network can be better controlled such that the voltage is within the predetermined range.

In addition, since the vehicle information includes information about the number and locations of vehicles and the states of the batteries within a predetermined period, a plan that better reflects the state of the vehicles can be created, and thus the voltage of the distribution network can be better controlled such that the voltage is within the predetermined range.

Further, when there is a point where the reactive power amount is insufficient, the reactive power amounts at other points are increased by the shortage of the reactive power amount, so that the voltage of the distribution network can be better controlled such that the voltage is within the predetermined range.

The power control system according to the present disclosure extracts time and a point at which the voltage of the distribution network is not within the predetermined range using the plan of the charge/discharge operation of the storage battery, creates a reactive power control plan for injecting the reactive power at the extracted time and point to keep the voltage of the distribution network within the predetermined range, and controls the reactive power according to the created reactive power control plan. Thus, the voltage of the distribution network can be controlled such that the voltage is within the predetermined range.

The power control system according to an embodiment extracts time and a point at which the voltage of the distribution network is not within the predetermined range using the plan of the charge/discharge operation of the storage battery, creates a reactive power control plan for injecting the reactive power at the extracted time and point to keep the voltage of the distribution network within the predetermined range, and controls the reactive power according to the created reactive power control plan. Thus, the voltage of the distribution network can be controlled such that the voltage is within the predetermined range.

According to an embodiment, it is possible to create a plan that reflects the state of the vehicles for each day of the week and better control the voltage of the distribution network such that the voltage is within a predetermined range.

According to an embodiment, it is possible to create a plan that better reflects the state of the vehicles and better control the voltage of the distribution network such that the voltage is within a predetermined range.

According to an embodiment, it is possible to better control the voltage of the distribution network such that the voltage is within a predetermined range.

According to an embodiment, it is possible to better control the voltage of the distribution network such that the voltage is within a predetermined range.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power control system that controls a demand-supply balance of electric power in a distribution network by controlling charge/discharge operations of storage batteries of a plurality of vehicles connected to the distribution network, the power control system comprising a control unit configured to:
    create a charge/discharge operation plan of the storage batteries within a predetermined period, the charge/discharge operation plan being based on (i) a power supply and demand plan of the distribution network within the predetermined period and (ii) vehicle information indicating states of the vehicles within the predetermined period,
    extract time and a point at which a voltage of the distribution network is not within a predetermined range using the charge/discharge operation plan of the storage batteries,
    create a reactive power control plan for injecting reactive power at the extracted time and point to keep the voltage of the distribution network within the predetermined range, and
    control the reactive power according to the created reactive power control plan.

2. The power control system according to claim 1, wherein the control unit creates the charge/discharge operation plan of the storage batteries and the reactive power control plan for each day of a week.

3. The power control system according to claim 1, wherein the vehicle information includes information about a number and locations of the vehicles and states of the storage batteries within the predetermined period.

4. The power control system according to claim 1, wherein when there is a point where a reactive power amount is insufficient, the control unit increases a reactive power amount at another point by the insufficient amount of the reactive power amount.

5. The power control system according to claim 1, wherein the control unit controls a reactive power amount of a charging stand to which the vehicles are connected.

6. A power control system that controls a demand-supply balance of electric power in a distribution network by controlling charge/discharge operations of storage batteries of a plurality of vehicles connected to the distribution network, the power control system comprising a control unit configured to
    create a charge/discharge operation plan of the storage batteries within a predetermined period using a power supply and demand plan of the distribution network within the predetermined period and vehicle information indicating states of the vehicles within the predetermined period, extract time and a point at which a voltage of the distribution network is not within a predetermined range using the charge/discharge operation plan of the storage batteries, create a reactive power control plan for injecting reactive power at the extracted time and point to keep the voltage of the distribution network within the predetermined range, and control the reactive power according to the created reactive power control plan, wherein when there is a point where a reactive power amount is insufficient, the control unit increases a reactive power amount at another point by the insufficient amount of the reactive power amount.

* * * * *